United States Patent
Liang et al.

(10) Patent No.: US 8,448,188 B2
(45) Date of Patent: May 21, 2013

(54) WEB USER INTERFACE COMPONENT COORDINATION

(75) Inventors: Zhengang Liang, North York (CA); John W. Stephenson, Blackstock (CA); Yi Wang, Markham (CA); Lei Zhang, Markham (CA); Jian Zhu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 12/140,559

(22) Filed: Jun. 17, 2008

(65) Prior Publication Data

US 2009/0313640 A1   Dec. 17, 2009

(51) Int. Cl.
*G06F 13/00*   (2006.01)

(52) U.S. Cl.
USPC ............................................. 719/318

(58) Field of Classification Search
USPC .......................................... 719/318
See application file for complete search history.

(56) References Cited

U.S. PATENT DOCUMENTS

| 2005/0198124 A1* | 9/2005 | McCarthy ..................... 709/203 |
| 2006/0224979 A1* | 10/2006 | Albrecht et al. ............. 715/760 |
| 2007/0234371 A1* | 10/2007 | Upton ........................... 719/320 |

* cited by examiner

*Primary Examiner* — Andy Ho
(74) *Attorney, Agent, or Firm* — Steven Greenberg, Esq.; Carey, Rodriguez, Greenberg & O'Keefe

(57) ABSTRACT

Embodiments of the present invention provide a method, system and computer program product for Web user interface component coordination. In an embodiment of the invention, a method for Web user interface component coordination can include receiving an event indicating a state change in one of many user interface components in a user interface for a Web application and determining whether or not remaining ones of the components are active and able to receive a notification of the event. In the former circumstance, notice of the event can be transmitted to the remaining ones of the components. However, in the latter circumstance, transmission of the notice of the event to the remaining ones of the components can be delayed until the components are determined to have become active and able to receive a notification of the event.

19 Claims, 2 Drawing Sheets

WEB USER INTERFACE COMPONENT COORDINATION

BACKGROUND OF THE INVENTION

1. Field of the Invention

The present invention relates to the field of Web application management and more particularly to user interface component event coordination in a Web application user interface.

2. Description of the Related Art

Distributed application technologies have progressed substantially over the course of the past half century. Initially centered about a centralized mainframe computing model with dumb terminals for client access, distributed application technologies matured through a client-server phase in which a substantial of the program logic resided within the client itself. Still, the demands of higher level computing resulted in increasing hardware requirements at the client side thus encouraging a retreat back to the hosted application model enabled by the Internet and the World Wide Web. In this regard, the Web acts as a tremendous enabler in distributing an application user interface and even medium weight program logic to a relatively lightweight client hosting a no-cost, common Web browser, thus eliminating the disadvantage of traditional client-server computing.

Initially, Web applications suffered from what may be termed as a less than robust user interface. Advances in user interface technologies and the advent of the portal concept, however, now permits a robust and complex user interface of multiple, independently functioning user interface components. Enabling technologies allow each component in the Web user interface to maintain separate network connectivity to backend logic and data sources. Further, enabling technologies allow each component in the Web user interface to refresh separately so as to not interfere with the view of neighboring components in the Web user interface. Consequently, the Web user interface of today rivals the traditional graphical user interface of client-server computing.

Notwithstanding the robustness of the Web application user interface, challenges remain. In this regard, different user interface components often require knowledge of the state of neighboring components in the user interface. Traditional methodologies for coordinating the communications of component state amongst the components of a user interface involve any of a dominant middleware solution, relentless cookie writing, or a highly complex event loop capturing events for each different component. These traditional methods suffer in many respects, though. For instance, middleware solutions determine when and how components are updated, thereby disallowing the autonomy of the components. Cookies inhibit scalability and event loops remain dependent on the unreliable timing of the receipt of events from the different components.

BRIEF SUMMARY OF THE INVENTION

Embodiments of the present invention address deficiencies of the art in respect to user interface component management and provide a novel and non-obvious method, system and computer program product for Web user interface component coordination. In an embodiment of the invention, a method for Web user interface component coordination can include receiving an event indicating a state change in one of many user interface components in a user interface for a Web application and determining whether or not remaining ones of the components are active and able to receive a notification of the event. In the former circumstance, notice of the event can be transmitted to the remaining ones of the components. However, in the latter circumstance, transmission of the notice of the event to the remaining ones of the components can be delayed until the components are determined to have become active and able to receive a notification of the event.

In one aspect of the embodiment, determining whether or not remaining ones of the user interface components are active and able to receive a notification of the event, can include determining whether or not one of the user interface components has been expanded within the user interface thereby obscuring a view of others of the user interface components. In another aspect of the embodiment, determining whether or not remaining ones of the user interface components are active and able to receive a notification of the event, can include determining whether the user interface has lost focus. In yet another aspect of the embodiment, determining whether or not remaining ones of the user interface components are active and able to receive a notification of the event, can include determining whether a Web page hosting the user interface has closed.

Comparably, in these different aspects of the embodiment, delaying transmission of the notice of the event to the remaining ones of the user interface components in the user interface for the Web application until the user interface components in the user interface for the Web application are determined to have become active and able to receive a notification of the event, can include delaying transmission of the notice of the event until the view of the others of the user interface components is no longer obscured by the expanded component, until the user interface has regained focus, or until a Web page hosting the user interface has opened, respectively.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for Web user interface component coordination. In accordance with an embodiment of the present invention, different components can be visually rendered within a Web user interface. Each component can provide for state changes based upon user interactions through the Web user interface. A controller can be communicatively coupled to each of the components and can receive state change events from the components as the state change events arise. The state change events in turn can be propagated to the components as the components remain active in the Web user interface. To the extent that the components are not active at a given time, the propagation of the components can be delayed until such time as the components become available. In this way, state changes for the components can be coordinated without requiring the use of cookies, an event loop or middleware and scalability of the Web application can be maintained.

Figure 1:
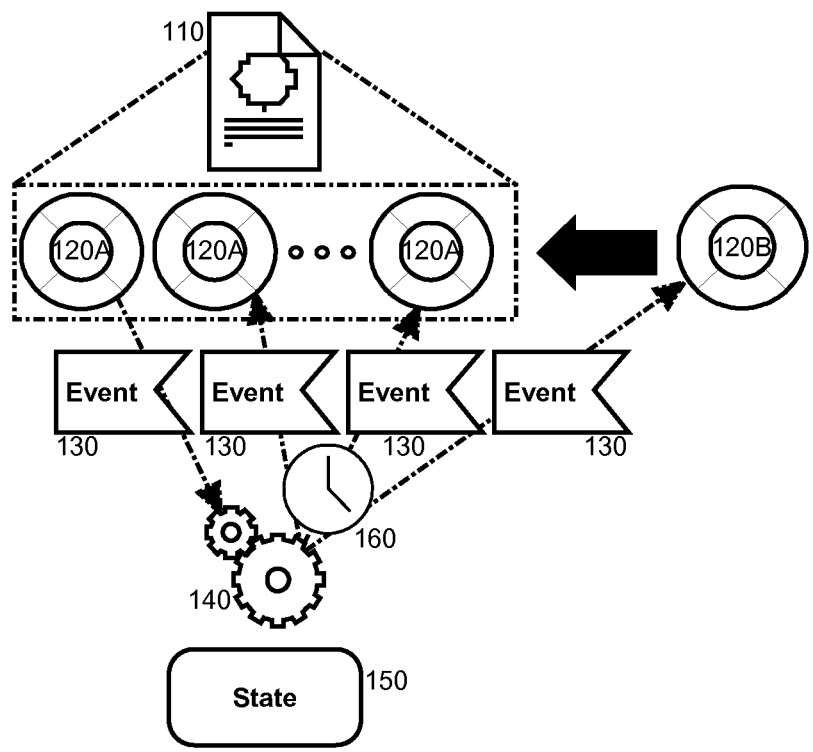
FIG. 1 is a pictorial illustration of a process for Web user interface component coordination.

In further illustration, FIG. 1 is a pictorial illustration of a process for Web user interface component coordination. As shown in FIG. 1, a Web page 110 can include multiple different user interface components 120A disposed within a user interface defined by the Web page 110. A component 120A within the Web page 110 can post an event 130 to a controller 140. The controller 140, in turn, can store the state 150 of the posting component 120A and can attempt to notify each other component 120A of the event 130. However, if the components 120A are not active and hence cannot receive notification of the event 130, the controller 140 can deliver notification of the event 130 to the components 120A after a delay 160.

In this regard, the controller 140 can monitor the state of the components 120A to arrive at a determination of whether or not notification of the event 130 is to be provided to the components 120A. Examples include whether or not the Web page 110 has lost focus to another window, or whether one of the component 120A has become dominant (e.g. maximized) in the view provided by the Web page 110 to the exclusion of others of the components 120A. Upon detecting a normalization of the view of the Web page 110 allowing the components 120A to receive notification (including newly added components 120B), the controller 140 can route notification of the event 130 to the components 120A, 120B in the Web page 110.

Figure 2:
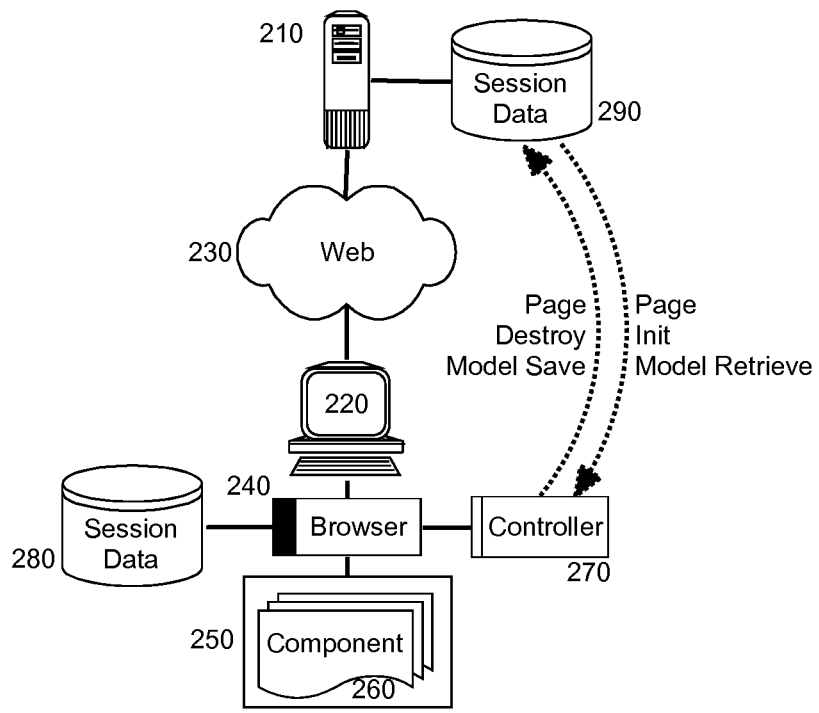
FIG. 2 is a schematic illustration of a Web application data processing system configured for Web user interface component coordination; and, FIG. 3 is a flow chart illustrating a process for Web user interface component coordination in a Web application data processing system.

The process described in reference to FIG. 1 can be embodied within a Web application data processing system. In further illustration, FIG. 2 schematically shows a Web application data processing system configured for Web user interface component coordination. The system can include a server 210 serving Web pages for a Web application session 250 over computer communications network 230 for rendering in a browser 240 executing in host 220. The Web application session 250 can include multiple different user interface components 260 in a user interface for the Web application session 250, each independently operating within the user interface, accepting user input through the user interface, and experience state changes in consequence of the user input.

Notably, controller 270 can be provided for execution in coordination with the browser 240 within the user interface for the Web application session 250. The controller 270 can include program code enabled to identify state change events in the different components 260, to persist the state change events as session data 280, to provide notice of the state change events to the different components 260, and to delay notice of the state change events to the different components 260, when the different components 260 are not active and cannot receive notice. The program code of the controller 270 further can enabled for the latter circumstance to persist the state change events remotely as session data 290 stored in connection with the server 210. Consequently, the program code of the controller 270 yet further can enabled at the time of a new Web application session to retrieve the state change events and provide the same to the components 260 in the user interface for the new Web application session.

Figure 3:
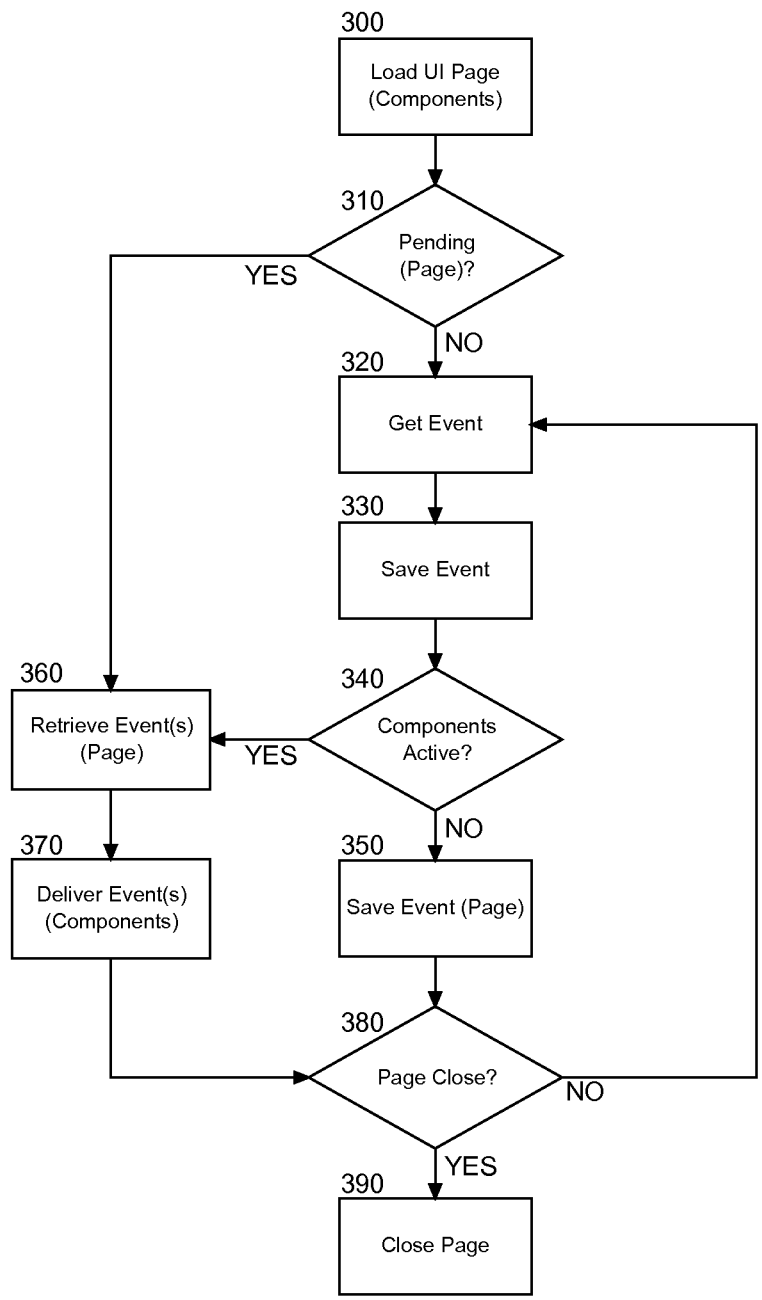

In yet further illustration, FIG. 3 is a flow chart illustrating a process for Web user interface component coordination in a Web application data processing system. The process can begin in block 300 with the loading of a user interface of different user interface components in a Web page. In decision block 310, it can be determined whether or not one or more events have been persisted for delivery to the user interface components in the Web page. If so, in block 360 the event or events can be retrieved from the session data for the Web page and delivered to the user interface components in the user interface in block 370, irrespective of whether the user interface components had been present in the user interface at the time of the event or events.

In decision block 310, if it is determined that one or more events have not been persisted for delivery to the user interface components in the Web page, the process can continue through the rendering of all user interface components in the Web page and in block 320 a first event can be received from one of the user interface components in respect to a state change in the component. In block 330, the event can be persisted locally and in decision block 340, if the other user interface components of the Web page are active and able to receive notice of the event, in block 360 the event or events can be retrieved from the session data for the Web page and delivered to the user interface components in the user interface in block 370, irrespective of whether the user interface components had been present in the user interface at the time of the event or events.

In decision block 340, however, if the other user interface components of the Web page are inactive and unable to receive notice of the event, in block 350 the event can be persisted remotely as session data for later retrieval and in decision block 380 it can be determined whether or not the Web page is to be closed. If not, the process can return to block 320 in which a next event from a component can be received and the process can repeat in blocks 330 through 380. Otherwise, the process can end with the closing of the Web page in block 390.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for Web user interface component coordination, the method comprising:
   receiving an event indicating a state change in one of a plurality of user interface components in a user interface for a Web application;
   determining whether or not remaining ones of the user interface components are active and able to receive a notification of the event; and,
   transmitting notice of the event to the remaining ones of the user interface components if active, but otherwise delaying transmission of the notice of the event to the remaining ones of the user interface components in the user interface for the Web application until the user interface components in the user interface for the Web application are determined to have become active and able to receive a notification of the event.

2. The method of claim 1, wherein determining whether or not remaining ones of the user interface components are active and able to receive a notification of the event, comprises determining whether or not one of the user interface components has been expanded within the user interface thereby obscuring a view of others of the user interface components.

3. The method of claim 1, wherein determining whether or not remaining ones of the user interface components are active and able to receive a notification of the event, comprises determining whether the user interface has lost focus.

4. The method of claim 1, wherein determining whether or not remaining ones of the user interface components are active and able to receive a notification of the event, comprises determining whether a Web page hosting the user interface has closed.

5. The method of claim 2, wherein delaying transmission of the notice of the event to the remaining ones of the user interface components in the user interface for the Web application until the user interface components in the user interface for the Web application are determined to have become active and able to receive a notification of the event, comprises delaying transmission of the notice of the event until the view of the others of the user interface components is no longer obscured by the expanded component.

6. The method of claim 3, wherein delaying transmission of the notice of the event to the remaining ones of the user interface components in the user interface for the Web application until the user interface components in the user interface for the Web application are determined to have become active and able to receive a notification of the event, comprises delaying transmission of the notice of the event until the user interface has regained focus.

7. The method of claim 4, wherein delaying transmission of the notice of the event to the remaining ones of the user interface components in the user interface for the Web application until the user interface components in the user interface for the Web application are determined to have become active and able to receive a notification of the event, comprises delaying transmission of the notice of the event until a Web page hosting the user interface has opened.

8. The method of claim 1, further comprising storing the received event remotely as session data for a Web page hosting the user interface.

9. The method of claim 1, further comprising storing the received event locally as session data for a Web page hosting the user interface.

10. A Web application data processing system configured for Web user interface component coordination, the system comprising:
    a content browser configured for coupling to a server serving Web pages over a computer communications network to the content browser, the Web pages each comprising a user interface comprising a plurality of user interface components; and,
    a controller comprising program code enabled to receive an event indicating a state change in one of the user interface components, to determine whether or not remaining ones of the user interface components are active and able to receive a notification of the event, and to transmit notice of the event to the remaining ones of the user interface components if active, but otherwise to delay transmission of the notice of the event to the remaining ones of the user interface components until the user interface components are determined to have become active and able to receive a notification of the event.

11. A computer program product comprising a computer usable storage medium storing computer usable program code for Web user interface component coordination, the computer program product comprising:
    computer usable program code for receiving an event indicating a state change in one of a plurality of user interface components in a user interface for a Web application;
    computer usable program code for determining whether or not remaining ones of the user interface components are active and able to receive a notification of the event; and,
    computer usable program code for transmitting notice of the event to the remaining ones of the user interface components if active, but otherwise delaying transmission of the notice of the event to the remaining ones of the user interface components in the user interface for the Web application until the user interface components in the user interface for the Web application are determined to have become active and able to receive a notification of the event.

12. The computer program product of claim 11, wherein the computer usable program code for determining whether or not remaining ones of the user interface components are active and able to receive a notification of the event, comprises computer usable program code for determining whether or not one of the user interface components has been expanded within the user interface thereby obscuring a view of others of the user interface components.

13. The computer program product of claim 11, wherein the computer usable program code for determining whether or not remaining ones of the user interface components are active and able to receive a notification of the event, comprises computer usable program code for determining whether the user interface has lost focus.

14. The computer program product of claim 11, wherein the computer usable program code for determining whether or not remaining ones of the user interface components are active and able to receive a notification of the event, comprises computer usable program code for determining whether a Web page hosting the user interface has closed.

15. The computer program product of claim 12, wherein the computer usable program code for delaying transmission of the notice of the event to the remaining ones of the user interface components in the user interface for the Web application until the user interface components in the user interface for the Web application are determined to have become active and able to receive a notification of the event, comprises computer usable program code for delaying transmission of the notice of the event until the view of the others of the user interface components is no longer obscured by the expanded component.

16. The computer program product of claim 13, wherein the computer usable program code for delaying transmission of the notice of the event to the remaining ones of the user interface components in the user interface for the Web application until the user interface components in the user interface for the Web application are determined to have become active and able to receive a notification of the event, comprises computer usable program code for delaying transmission of the notice of the event until the user interface has regained focus.

17. The computer program product of claim 14, wherein the computer usable program code for delaying transmission of the notice of the event to the remaining ones of the user interface components in the user interface for the Web application until the user interface components in the user interface for the Web application are determined to have become active and able to receive a notification of the event, comprises computer usable program code for delaying transmission of the notice of the event until a Web page hosting the user interface has opened.

18. The computer program product of claim 11, further comprising computer usable program code for storing the received event remotely as session data for a Web page hosting the user interface.

19. The computer program product of claim 11, further comprising computer usable program code for storing the received event locally as session data for a Web page hosting the user interface.

* * * * *